(12) United States Patent
Hsu et al.

(10) Patent No.: US 12,372,776 B2
(45) Date of Patent: Jul. 29, 2025

(54) OPTICAL SYSTEM

(71) Applicant: TDK TAIWAN CORP., Taoyuan (TW)

(72) Inventors: Chan-Jung Hsu, Taoyuan (TW);
Chen-Hsin Huang, Taoyuan (TW);
Chen-Hung Chao, Taoyuan (TW);
Yi-Ho Chen, Taoyuan (TW); Kun-Shih Lin, Taoyuan (TW); Shou-Jen Liu,
Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 210 days.

(21) Appl. No.: 18/172,833

(22) Filed: Feb. 22, 2023

(65) Prior Publication Data
US 2023/0266635 A1    Aug. 24, 2023

Related U.S. Application Data

(60) Provisional application No. 63/312,987, filed on Feb. 23, 2022.

(51) Int. Cl.
*G02B 26/02*    (2006.01)
*G03B 9/06*    (2021.01)
*H02K 41/035*    (2006.01)

(52) U.S. Cl.
CPC .............. *G02B 26/02* (2013.01); *G03B 9/06* (2013.01); *H02K 41/0354* (2013.01)

(58) Field of Classification Search
CPC .............. G03B 9/06; G03B 9/22; G03B 9/24
See application file for complete search history.

(56) References Cited

U.S. PATENT DOCUMENTS

2020/0301246 A1*    9/2020  Seo ........................ H04N 23/55

\* cited by examiner

*Primary Examiner* — Noam Reisner
(74) *Attorney, Agent, or Firm* — MUNCY, GEISSLER, OLDS & LOWE, P.C.

(57) ABSTRACT

An optical system includes a first optical element driving mechanism, including a first fixed assembly, a first movable assembly, and a first driving assembly. The first movable assembly is configured to be connected to at least two first optical elements. The first movable assembly includes a first movable element. The first driving assembly is configured to drive the first movable assembly to move relative to the first fixed assembly. The first fixed assembly and the first movable assembly are arranged along a main axis. The first driving assembly is configured to drive the first movable element to move around the main axis. A portion of the first driving assembly is disposed on the first movable element. When viewed in a direction perpendicular to the main axis, the first driving assembly exceeds the first fixed assembly and the first movable assembly.

20 Claims, 13 Drawing Sheets

OPTICAL SYSTEM

CROSS REFERENCE TO RELATED APPLICATIONS

This application claims the benefit of U.S. Provisional Application No. 63/312,987, filed on Feb. 23, 2022, the entirety of which is incorporated by reference herein.

BACKGROUND OF THE INVENTION

Field of the Disclosure

The present disclosure relates to an optical system, and in particular it relates to an optical system having an aperture structure.

Description of the Related Art

As technology has developed, many of today's electronic devices (such as smartphones) have a camera and video functionality. Using the camera modules disposed in electronic devices, users can capture photographs and record videos on their electronic devices.

Today's designs for electronic devices continue to follow the trend of miniaturization, meaning that the various components of the camera module and its structure must also be continuously reduced, so as to achieve miniaturization. In general, a driving mechanism in a camera module has a camera lens holder configured to hold a camera lens, and the driving mechanism can have the functions of auto focusing or optical image stabilization. In addition, the camera module can also be equipped with an aperture mechanism to adjust the amount of light. However, although the existing driving mechanisms can achieve the aforementioned functions of photographing and video recording, they still cannot meet all of the users' needs.

Therefore, how to design a camera module that can perform auto-focus, optical anti-shake, adjust the amount of light and achieve miniaturization at the same time are topics nowadays that need to be discussed and solved.

BRIEF SUMMARY OF THE INVENTION

Accordingly, one objective of the present disclosure is to provide an optical system to solve the above problems.

According to some embodiments of the disclosure, an optical system is provided and includes a first optical element driving mechanism, which includes a first fixed assembly, a first movable assembly, and a first driving assembly. The first movable assembly is configured to be connected to at least two first optical elements, and the first movable assembly is movable relative to the first fixed assembly. The first movable assembly includes a first movable element. The first driving assembly is configured to drive the first movable assembly to move relative to the first fixed assembly. The first fixed assembly and the first movable assembly are arranged along a main axis, the first driving assembly is configured to drive the first movable element to move around the main axis, and a portion of the first driving assembly is disposed on the first movable element. When viewed in a direction perpendicular to the main axis, the first driving assembly exceeds the first fixed assembly and the first movable assembly.

According to some embodiments, the optical system further includes a second optical element driving mechanism. The first optical element driving mechanism is disposed on the second optical element driving mechanism. The second optical element driving mechanism includes a second fixed assembly, a second movable assembly and a second driving assembly. The second movable assembly is configured to be connected to a second optical element. The second driving assembly is configured to drive the second movable assembly and the second optical element to move relative to the second fixed assembly. The second fixed assembly includes a casing and a second base. The casing is affixed to the second base to form an accommodation space. The accommodation space is configured to accommodate the second movable assembly and the second driving assembly.

According to some embodiments, the casing surrounds a portion of the first optical element driving mechanism. When viewed in a direction perpendicular to the main axis, a portion of the first optical element driving mechanism protrudes from the casing. The first optical element driving mechanism further includes a first circuit assembly fixedly disposed on the casing. The first driving assembly includes a first coil and a first magnetic element, and the first coil corresponds to the first magnetic element. The first coil is fixedly disposed on the first circuit assembly.

According to some embodiments, the casing has a top wall, and a portion of the first circuit assembly is affixed to the top wall. When viewed along the first axis, the casing further has a supporting wall, which extends from the top wall toward the second base along a second axis. The first axis is perpendicular to the second axis and the main axis. The second axis is parallel to the main axis. When viewed along a third axis, the first circuit assembly overlaps the first movable assembly and at least two first optical elements. The third axis is perpendicular to the first axis and the second axis. When viewed along the second axis, a portion of the first circuit assembly overlaps the second driving assembly.

According to some embodiments, the second fixed assembly further includes a supporting member which is affixed to the supporting wall. The supporting member has a plate-shaped structure extending along the second axis. When viewed along the first axis, a first length of the supporting member along the second axis is different from a second length of the supporting wall along the second axis.

According to some embodiments, when viewed along the first axis, the first length of the supporting member along the second axis is greater than the second length of the supporting wall along the second axis. The first length is more than twice the second length. The casing and the supporting member are made of non-magnetic metal materials.

According to some embodiments, the first circuit assembly has a first segment, a second segment and a third segment. When viewed along the first axis, the second segment is connected between the first segment and the third segment. The first segment, the second segment and the third segment are affixed to the supporting member. The first segment and the third segment extend along the second axis. The second segment extends along the third axis. When viewed along the first axis, the first segment and the third segment are fixed on opposite sides of the supporting member.

According to some embodiments, when viewed along the first axis, a third length of the first segment along the second axis is different from a fourth length of the third segment along the second axis. When viewed along the first axis, the third length of the first segment along the second axis is greater than the fourth length of the third segment along the second axis.

According to some embodiments, the first coil is fixedly disposed on the first segment. The first coil defines a long axis parallel to the second axis. When viewed along the third axis, the first segment completely covers the first coil. When viewed along the third axis, the first segment, the supporting member and the first coil exceed the second optical element driving mechanism.

According to some embodiments, the first circuit assembly further has a fourth segment, a fifth segment, a sixth segment and a seventh segment. The fourth segment is connected between the third segment and the fifth segment. The fifth segment is connected between the fourth segment and the sixth segment. The sixth segment is connected between the fifth segment and the seventh segment. The fourth segment extends along the third axis.

According to some embodiments, the fourth segment is affixed to the top wall. The fifth segment to the seventh segment are affixed to a front side wall of the casing. When viewed along the third axis, the fifth segment and the seventh segment extend along the second axis. When viewed along the third axis, the sixth segment extends along the first axis.

According to some embodiments, when viewed along the third axis, the width of the fifth segment along the first axis is different from the width of the seventh segment along the first axis. When viewed along the third axis, the width of the fifth segment along the first axis is greater than the width of the seventh segment along the first axis.

According to some embodiments, the second movable assembly includes a holder and a second frame. The second frame surrounds a portion of the first optical element driving mechanism. When viewed in a direction perpendicular to the main axis, the second frame overlaps at least a portion of a first frame of the first fixed assembly. The second frame forms an accommodating groove configured to accommodate the supporting member and a portion of the first circuit assembly. When viewed along the second axis, the width of the accommodating groove is greater than the width of the second segment.

According to some embodiments, the first movable element includes a first body and a radial extending portion. The first body has a ring structure. The radial extending portion radially extends from the first body. The radial extending portion has a receiving groove. The first magnetic element is disposed in the receiving groove.

According to some embodiments, when viewed along the main axis, the radial extending portion has an arc-shaped structure. When viewed along the main axis, the first magnetic element has an arc-shaped structure. The shape of the arc-shaped structure of the first magnetic element corresponds to the shape of the arc-shaped structure of the radial extending portion. When viewed along a first axis, the first magnetic element is exposed from the casing. When viewed in a direction perpendicular to the main axis, the first magnetic element overlaps the top wall.

According to some embodiments, the second optical driving mechanism further includes a second circuit assembly electrically connected to the second driving assembly. The second circuit assembly includes a substrate and a second circuit element. The second circuit element includes a first extending portion, a second extending portion, a third extending portion, a curved portion and a second contact portion. The first extending portion extends from the substrate along the second axis. The second extending portion is connected to the first extending portion. The second extending portion is connected to the third extending portion. Extending directions of the second extending portion and the third extending portion are different. The curved portion is connected between the second contact portion and the third extending portion. An extending direction of the curved portion is different from an extending direction of the second contact portion and the third extending portion.

According to some embodiments, the second extending portion is in contact with the first sidewall of the second frame. The third extending portion is not in contact with the rear sidewall of the second frame. A portion of the curved portion is not in contact with the rear sidewall. The second contact portion is in contact with the rear sidewall. A second slot is formed on the rear sidewall, and a portion of the second contact portion is inserted into the second slot.

According to some embodiments, a second position-sensing element is disposed on the second contact portion. The second position-sensing element is electrically connected to the second contact portion. When viewed along the main axis, the second position-sensing element overlaps the second frame.

According to some embodiments, a sensing magnet is disposed in a protruding structure of the holder, and the sensing magnet corresponds to the second position-sensing element. When viewed along the main axis, the shortest distance between the second position-sensing element and a side of the holder is greater than the shortest distance between the second position-sensing element and the sensing magnet. When viewed along the main axis, the distance between the sensing magnet and the second contact portion in the third axis is less than the distance between the sensing magnet and the third extending portion in the third axis.

According to some embodiments, the first circuit assembly has a first electrical connection portion. The second circuit assembly has a second electrical connection portion. The first electrical connection portion and the second electrical connection portion are located on the same side of the optical system. The second base has a first supporting portion configured to support the first electrical connection portion. The second base further has a second supporting portion configured to support the second electrical connection portion. When viewed along the first axis, the first electrical connection portion does not overlap the second electrical connection portion. When viewed along the first axis, the fourth segment to the seventh segment do not overlap the casing.

The present disclosure provides an optical system including a first optical element driving mechanism and a second optical element driving mechanism. The first optical element driving mechanism may serve as an aperture mechanism, configured to adjust the amount of light entering the optical system. The second optical element driving mechanism can achieve the functions of auto-focusing (AF) and optical image stabilization (OIS).

In some embodiments, the second fixed assembly may include the supporting member affixed to the casing, and the supporting member extends beyond the casing along the second axis. The first circuit assembly is a flexible circuit board configured to be bent into multiple segments to be fixed on the supporting member, and the first coil is affixed to the first segment. Based on this structural configuration, the convenience for the operator to install the first circuit assembly and the first coil can be increased, and the movement of the first movable element can be more stable and smooth. Furthermore, based on the configuration of the first coil, the first magnetic element and the first movable element, the aperture size of the first optical element driving mechanism can be continuously changed.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1:
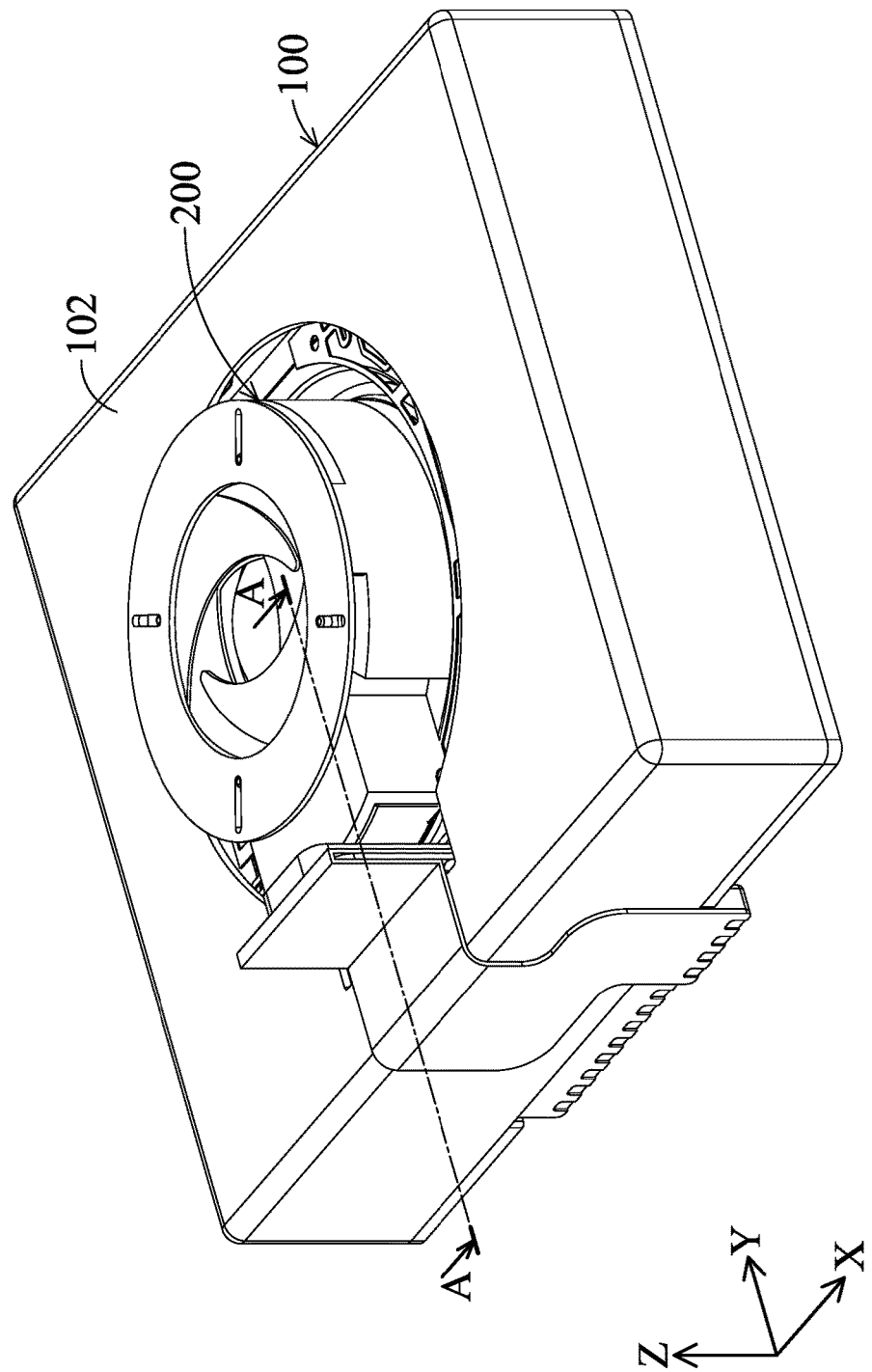
FIG. 1 is a schematic diagram of an optical system 10 according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 2:
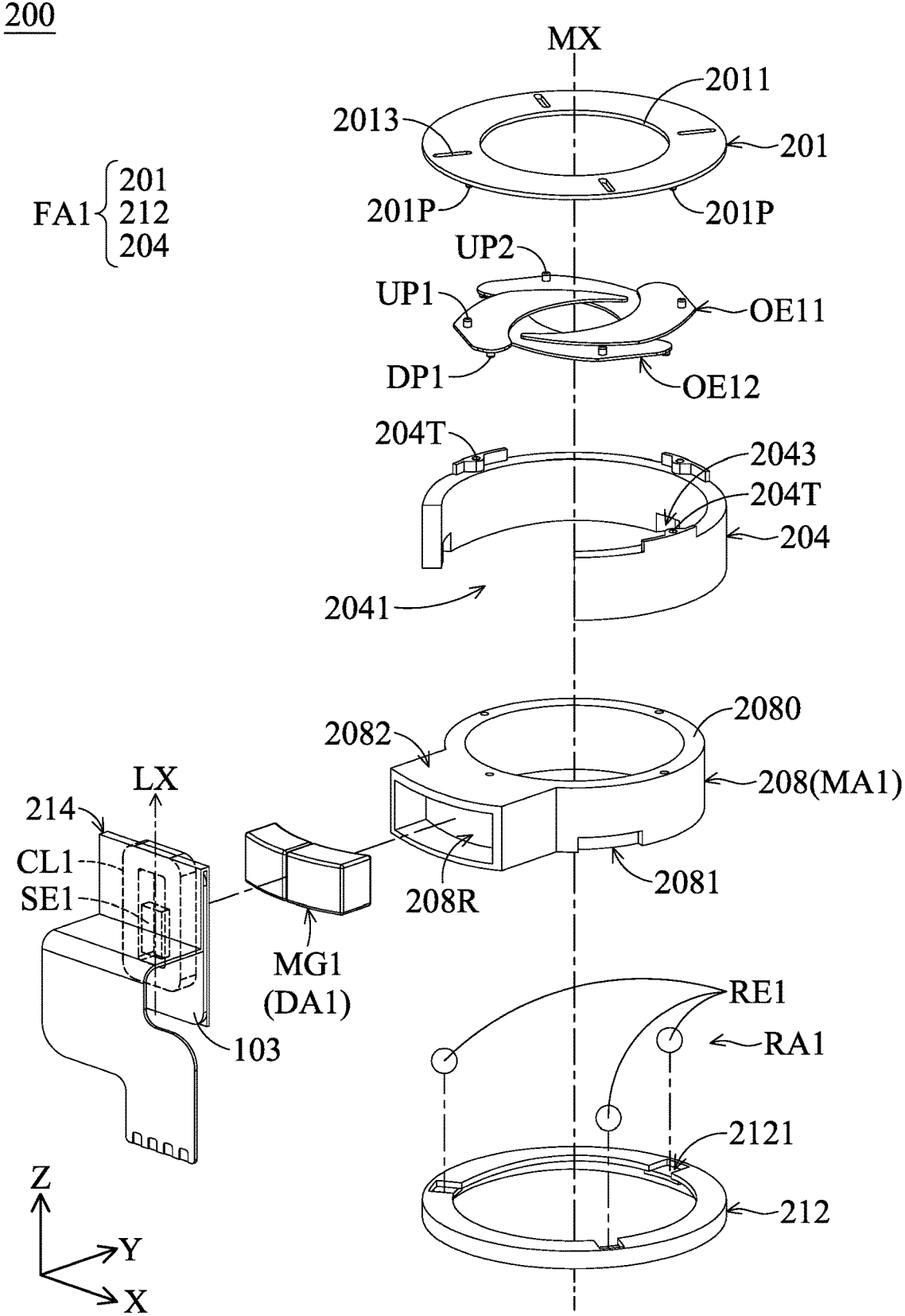
FIG. 2 is an exploded diagram of a first optical element driving mechanism 200 according to an embodiment of the present disclosure.
Figure 3:
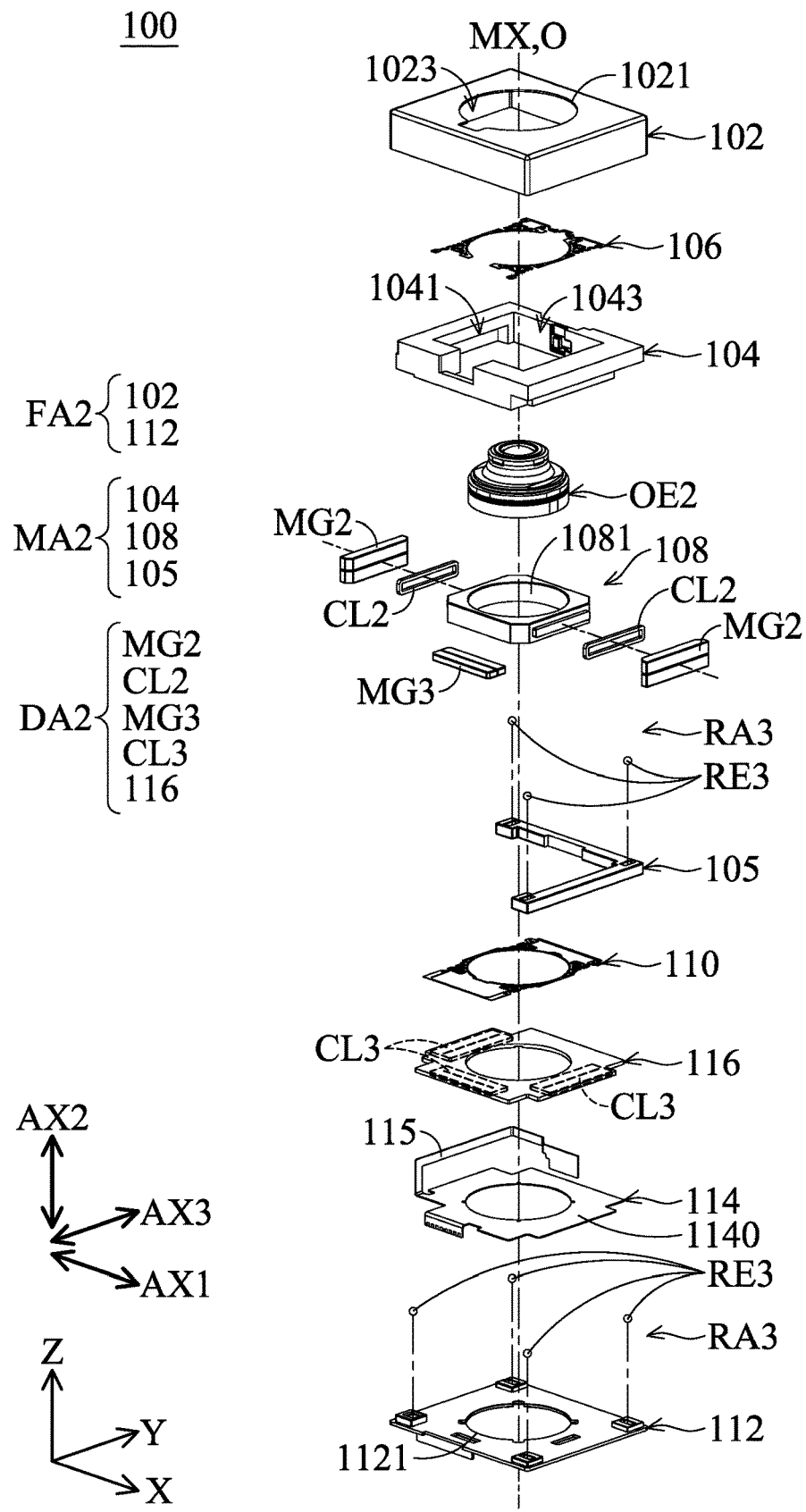
FIG. 3 is an exploded diagram of a second optical element driving mechanism 100 according to an embodiment of the present disclosure.

Please refer to FIG. 1 to FIG. 3. FIG. 1 is a schematic diagram of an optical system 10 according to an embodiment of the present disclosure, FIG. 2 is an exploded diagram of a first optical element driving mechanism 200 according to an embodiment of the present disclosure, and FIG. 3 is an exploded diagram of a second optical element driving mechanism 100 according to an embodiment of the present disclosure. The optical system 10 can be an optical camera system and can be configured to hold and drive an optical element. The optical system 10 can be installed in various electronic devices or portable electronic devices, such as a smartphone, for allowing a user to perform the image capturing function. In this embodiment, the optical system 10 can be a voice coil motor (VCM) with an auto-focusing (AF) function, but it is not limited thereto. In other embodiments, the optical system 10 can also perform the functions of auto-focusing and optical image stabilization (OIS).

In this embodiment, the optical system 10 may include the first optical element driving mechanism 200 and the second optical element driving mechanism 100. The first optical element driving mechanism 200 may serve as an aperture mechanism, configured to adjust the amount of light entering the optical system 10. The second optical element driving mechanism 100 can be the aforementioned voice coil motor, so that the optical system 10 can have auto focus (AF) and optical anti-shake (OIS) functions. In this embodiment, the first optical element driving mechanism 200 is disposed on the second optical element driving mechanism 100.

The first optical element driving mechanism 200 includes a first fixed assembly FA1, a first movable assembly MA1, and a first driving assembly DA1. The first movable assembly MA1 is configured to be connected to at least two first optical elements, and the first movable assembly MA1 is movable relative to the first fixed assembly FA1. The first movable assembly MA1 may include a first movable element 208. The first driving assembly DA1 is configured to drive the first movable assembly MA1 to move relative to the first fixed assembly FA1.

As shown in FIG. 2, the first fixed assembly FA1 and the first movable assembly MA1 are arranged along a main axis MX, and the first driving assembly DA1 is configured to drive the first movable element 208 to move around the main axis MX. A first magnetic element MG1 of the first driving assembly DA1 is disposed on the first movable element 208.

Furthermore, the first optical element driving mechanism 200 further includes a first circuit assembly 214, and the first driving assembly further includes a first coil CL1 corresponding to the first magnetic element MG1. The first coil CL1 is fixedly disposed on the first circuit assembly 214 and faces the first magnetic element MG1.

The first fixed assembly FA1 may include an outer shielding member 201, a first frame 204 and a first base 212. The first frame 204 is affixed to the first base 212, the outer shielding member 201 is affixed to the first frame 204, and the first frame 204 is located between the outer shielding member 201 and the first base 212.

When viewed along the main axis MX, the outer shielding member 201 has a ring structure and a first outer opening 2011. Furthermore, a plurality of fixed pillars 201P can be formed on the bottom of the outer shielding member 201 and are configured to be inserted into a plurality of fixed slots 204T on the first frame 204, respectively.

Furthermore, the first movable element 208 is disposed in the first frame 204, and the first movable element 208 is rotatable around the main axis MX relative to the first frame 204. Specifically, the first optical element driving mechanism 200 may further include a first rolling assembly RA1 disposed between the first movable element 208 and the first base 212.

In this embodiment, the first rolling assembly RA1 includes at least three first rolling elements RE1. The first rolling element RE1 is, for example, a sphere, and is disposed in a groove 2121 of the first base 212, an accommodating groove 2043 of the first frame 204 and a groove 2081 of the first movable element 208, so that the first movable element 208 rotates around the main axis MX relative to the first base 212 and the first frame 204 by these first rolling elements RE1.

Figure 4:
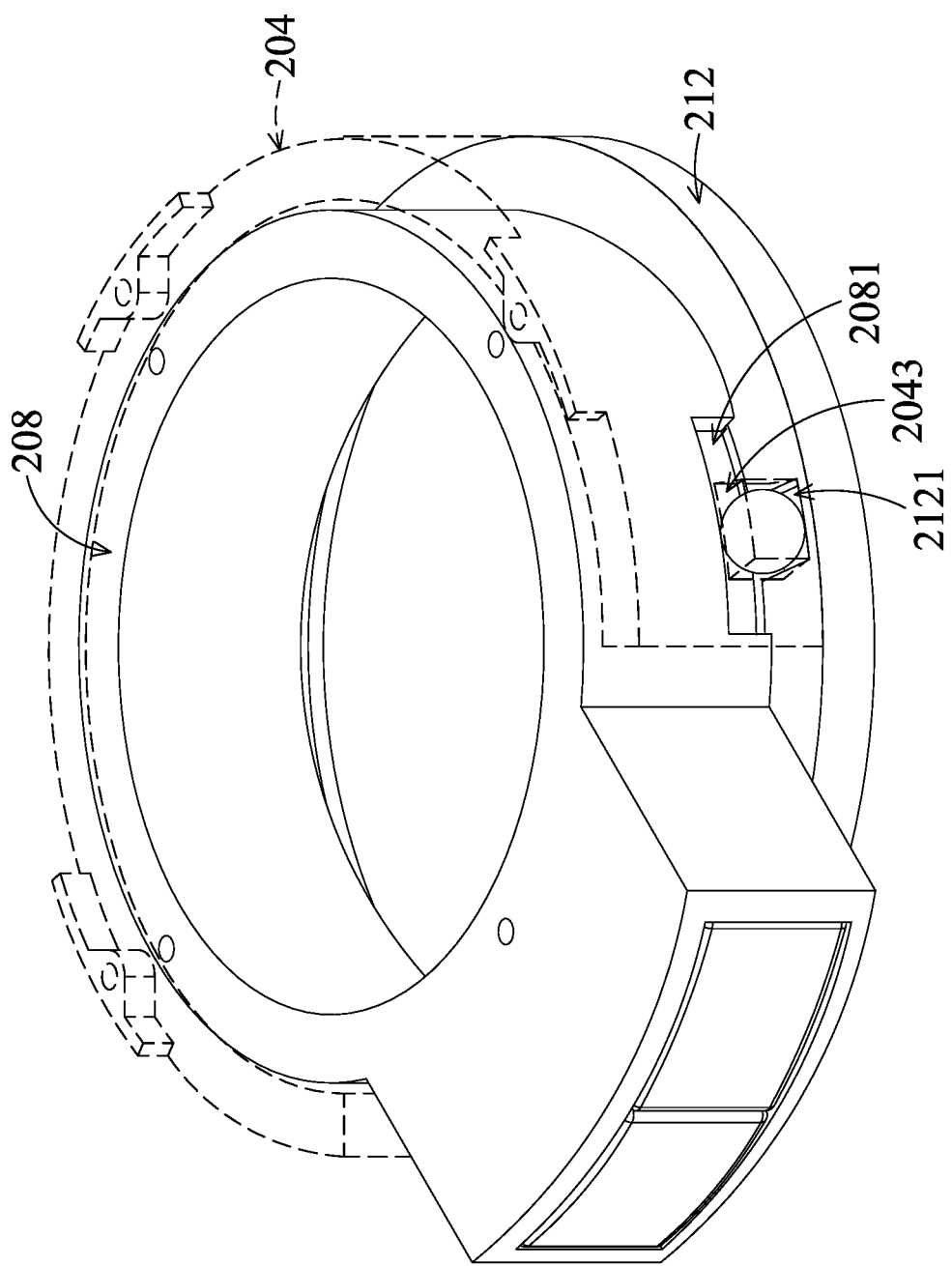
FIG. 4 is a perspective view of a partial structure of the first optical element driving mechanism 200 according to an embodiment of the present disclosure.
Figure 5:
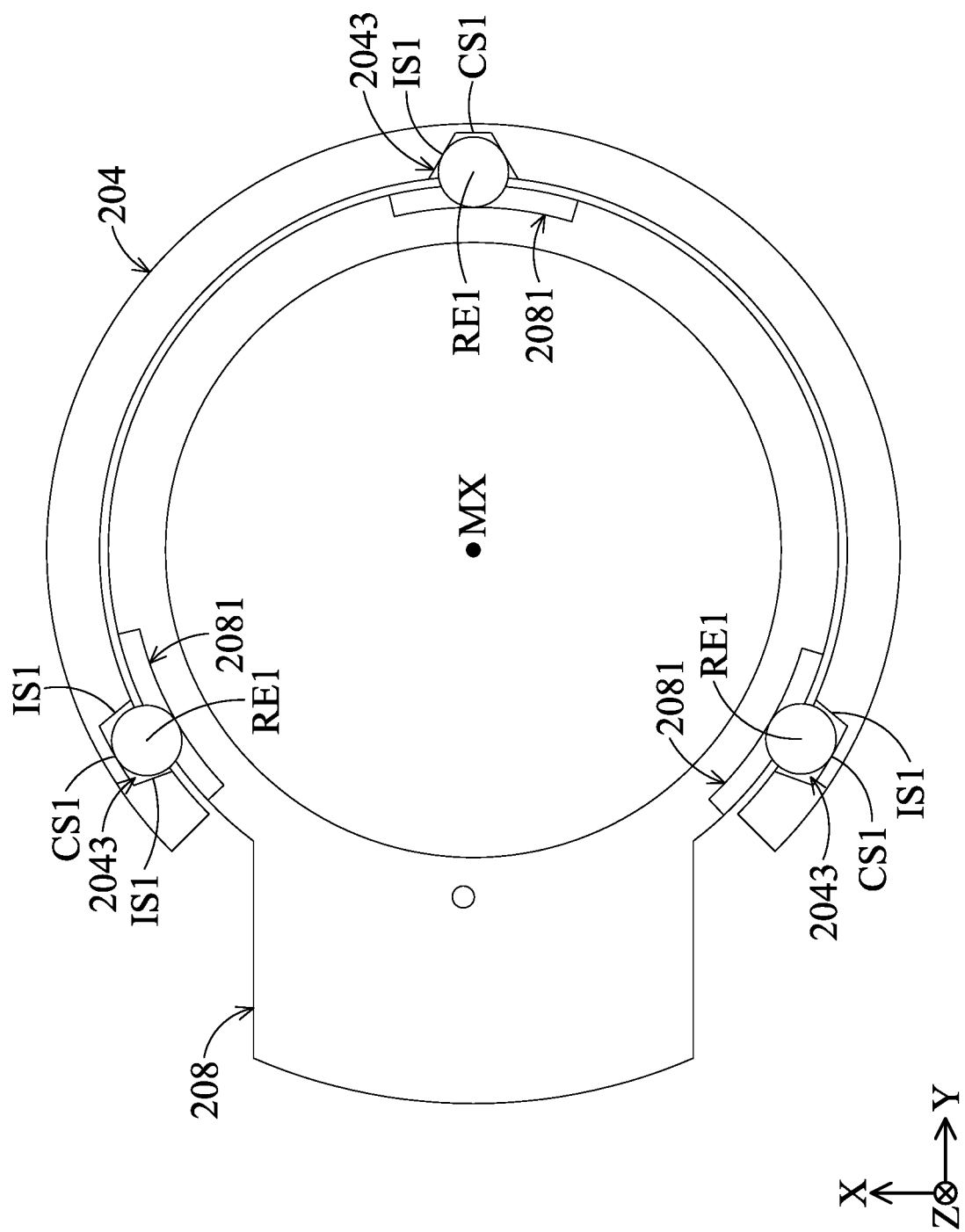
FIG. 5 is a bottom view of a partial structure of the first optical element driving mechanism 200 according to an embodiment of the present disclosure.

Please continue to refer to FIG. 2, FIG. 4 and FIG. 5. FIG. 4 is a perspective view of a partial structure of the first optical element driving mechanism 200 according to an embodiment of the present disclosure, and FIG. 5 is a bottom view of a partial structure of the first optical element driving mechanism 200 according to an embodiment of the present disclosure. The first frame 204 has three accommodating grooves 2043, and the first movable element 208 has three grooves 2081, corresponding to the above-mentioned three accommodating grooves 2043, respectively.

Correspondingly, the first base 212 has three grooves 2121, respectively corresponding to the above-mentioned three grooves 2081. The three first rolling elements RE1 are respectively disposed in the three accommodating grooves 2043, the three grooves 2081 and the three grooves 2121. As shown in FIG. 5, when viewed along the main axis MX, each of these accommodating grooves 2043 has two side surfaces IS1 and a connecting surface CS1.

The connecting surface CS1 is connected between the two side surfaces IS1, and the connecting surface CS1 is neither parallel nor perpendicular to the two side surfaces IS1. It is worth noting that one of the three first rolling elements RE1 (the first rolling element RE1 on the right side in FIG. 5) is configured to be in contact with the two side surfaces IS1 of the corresponding accommodating groove 2043 instead of being in contact with the corresponding connecting surface CS1, and the minimum distance between the two side surfaces IS1 of the accommodating groove 2043 is less than the diameter of the first rolling element RE1.

The other two of the three first rolling elements RE1 (the two first rolling elements RE1 on the left side in FIG. 5) are configured to be in contact with the connecting surface CS1 of the corresponding accommodating groove 2043, and the minimum distance between the two sides surfaces IS1 of the accommodating groove 2043 is greater than or equal to the diameter of the first rolling element RE1. It is worth noting that when the first movable element 208 rotates relative to the first frame 204, the first rolling element RE1 in the upper left corner (or the lower left corner) may not be in contact with the corresponding two side surfaces IS1, or may only be in contact with one of the corresponding side surfaces IS1.

Figure 6:
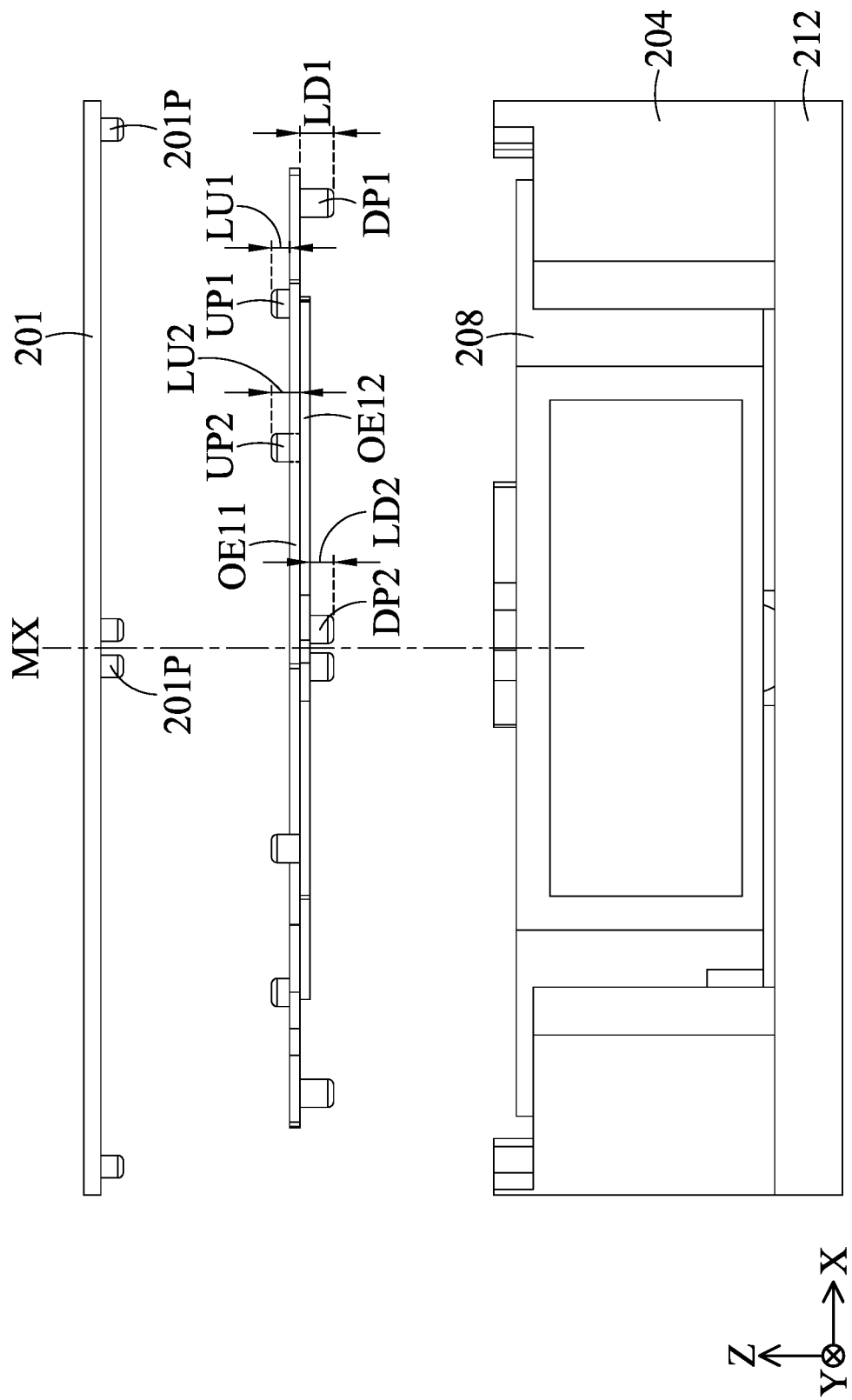
FIG. 6 is an exploded front view of the first optical element driving mechanism 200 according to an embodiment of the present disclosure.

Please refer to FIG. 2 and FIG. 6. FIG. 6 is an exploded front view of the first optical element driving mechanism 200 according to an embodiment of the present disclosure. In this embodiment, the first optical element driving mechanism 200 may include two first optical elements OE11 and two first optical elements OE12, which are movably connected to the first movable element 208. The number of the first optical element is not limited to this embodiment. When the first movable element 208 rotates around the main axis MX, the first optical elements OE11 and two first optical elements OE12 can move relative to the first fixed assembly FA1 and the first movable assembly MA1, thereby adjusting the amount of external light entering the first optical element driving mechanism 200 from the exterior.

Specifically, four first guiding grooves 2013 are formed on the outer shielding member 201, each first optical element OE11 has a first upper protruding pillar UP1 and a first lower protruding pillar DP1, and each first optical element OE12 has a second upper protruding pillar UP2 and a second lower protruding pillar DP2. When viewed along the main axis MX, the first upper protruding pillar UP1 does not overlap the first lower protruding pillar DP1, and the second upper protruding pillar UP2 does not overlap the second lower protruding pillar DP2.

The first lower protruding pillar DP1 and the second lower protruding pillar DP2 are configured to be inserted into the first movable element 208, and the first guiding grooves 2013 are configured to accommodate the corresponding first upper protruding pillar UP1 and the second upper protruding pillar UP2. When the first movable element 208 rotates around the main axis MX, the first optical element OE11 rotates around the first lower protruding pillar DP1, and the first upper protruding pillar UP1 is configured to move along the corresponding first guiding groove 2013. Similarly, the first optical element OE12 rotates around the second lower protruding pillar DP2, and the second upper protruding pillar UP2 is configured to move along the corresponding first guiding groove 2013. Thus, the first optical elements OE11, OE12 selectively blocks the first inner opening 2031.

As shown in FIG. 2 and FIG. 6, each of the aforementioned first optical elements OE11, OE12 has a plate-shaped structure. The main axis MX is perpendicular to the extending direction of the plate-shaped structure. For example, the plate-shaped structure extends along the X-axis and the Y-axis, and the main axis MX is parallel to the Z-axis. When viewed in a direction that is perpendicular to the main axis MX, the distance between the first optical element OE11 and the first base 212 in the main axis MX is different from the distance between the first optical element OE12 and the first base 212 in the main axis MX.

When viewed in a direction that is perpendicular to the main axis MX, the length LU1 of the first upper protruding pillar UP1 is different from the length LU2 of the second upper protruding pillar UP2. When viewed in a direction that is perpendicular to the main axis MX, the length LU1 of the first upper protruding pillar UP1 is less than the length LU2 of the second upper protruding pillar UP2. When viewed in a direction that is perpendicular to the main axis MX, the length LD1 of the first lower protruding pillar DP1 is different from the length LD2 of the second lower protruding pillar DP2. When viewed in a direction that is perpendicular to the main axis MX, the length LD1 of the first lower protruding pillar DP1 is greater than the length LD2 of the second lower protruding pillar DP2.

The first movable element 208 has a first body 2080 and a radial extending portion 2082. When viewed along the main axis MX, the first body 2080 has a ring structure. The radial extending portion 2082 radially extends from the first body 2080, and the radial extending portion 2082 has a receiving groove 208R. The first magnetic element MG1 is fixedly disposed in the receiving groove 208R.

As shown in FIG. 2, the first frame 204 has an arc opening 2041, and the radial extending portion 2082 is exposed from the arc opening 2041. It is worth noting that the angle of the arc opening 2041 is greater than the limit movement angle (the maximum angle of movement) of the first movable element 208.

Next, as shown in FIG. 3, the second optical element driving mechanism 100 includes a second fixed assembly FA2, a second movable assembly MA2 and a second driving assembly DA2. The second movable assembly MA2 is configured to be connected to a second optical element OE2. The second driving assembly DA2 is configured to drive the second movable assembly MA2 and the second optical element OE2 to move relative to the second fixed assembly FA2.

The second fixed assembly FA2 includes a casing 102 and a second base 112. The casing 102 is affixed to the second base 112 to form an accommodation space 1023, and the accommodation space 1023 is configured to accommodate the second movable assembly MA2 and the second driving assembly DA2. Additionally, as shown in FIG. 1, the casing 102 may surround a portion of the first optical element driving mechanism 200.

Furthermore, in this embodiment, the second movable assembly MA2 may include a second frame 104, a holder 108 and an intermediate bracket 105. The holder 108 is configured to hold the second optical element OE2.

As shown in FIG. 3, the aforementioned casing 102 has a hollow structure, and a casing opening 1021 is formed thereon, and a base opening 1121 is formed on the second base 112. The center of the casing opening 1021 corresponds to an optical axis O of the second optical element OE2 held by the holder 108, and the base opening 1121 corresponds to an image sensing element (not shown) disposed under the second base 112.

As shown in FIG. 3, the holder 108 has a hollow annular structure, and has a through hole 1081. The through hole 1081 forms a threaded structure (not shown) corresponding to another threaded structure (not shown) on the second optical element OE2, such that the second optical element OE2 can be locked in the through hole 1081. Furthermore, the second driving assembly DA2 may include two second coils CL2 disposed on the holder 108.

In this embodiment, the second driving assembly DA2 may further include two second magnetic elements MG2 and a third magnetic element MG3. The second frame 104 has a plurality of grooves 1041 and a central opening 1043. In this embodiment, the second frame 104 has three grooves 1041 for accommodating the aforementioned second magnetic elements MG2 and third magnetic element MG3, but the number of grooves 1041 and magnetic elements is not limited to this embodiment. The holder 108 and the aforementioned second optical element OE2 are disposed in the central opening 1043 and can move relative to the second frame 104. In this embodiment, the first magnetic element MG1, the second magnetic element MG2 and the third magnetic element MG3 can be magnets, but they are not limited thereto.

Furthermore, the second driving assembly DA2 may further include a circuit board 116. The circuit board 116 has three third coils CL3 disposed therein. The number of the third coils CL3 is not limited to this embodiment. The second optical element driving mechanism 100 further includes a second circuit assembly 114 electrically connected to the second driving assembly DA2. Specifically, the second circuit assembly 114 is electrically connected to the circuit board 116 and an external control circuit, and the external control circuit can control the third coils CL3 to be turned on or off. The second circuit assembly 114 may be a flexible circuit board, but it is not limited thereto.

In this embodiment, the optical system 10 may further include a first elastic element 106 and a second elastic element 110, and the holder 108 may be connected to the second frame 104 through the first elastic element 106 and the second elastic element 110 to be suspended in the central opening 1043. When the second coils CL2 are energized, the two second magnetic elements MG2 act with the second coils CL2 to generate an electromagnetic driving force, thereby driving the holder 108 to move along the optical axis O (the Z-axis) relative to the second frame 104 to perform the auto focusing function.

As shown in FIG. 3, the second optical element driving mechanism 100 may further include a third rolling assembly RA3. The third rolling assembly RA3 may include seven third rolling elements RE3 (balls). three of the third rolling elements RE3 are disposed between the second frame 104 and the intermediate bracket 105, other three third rolling elements RE3 are disposed between the intermediate bracket 105 and the second base 112, and the last third rolling element RE3 is disposed between the second frame 104 and the second base 112.

Therefore, the second frame 104 can move along a third axis AX3 (the Y-axis) relative to the intermediate bracket 105 by the third rolling assembly RA3, and the intermediate bracket 105 and the second frame 104 can move along a first axis AX1 (the X-axis) relative to the second base 112 by the third rolling assembly RA3. The third axis AX3 is perpendicular to the first axis AX1.

When the third coils CL3 are energized and are induced with the corresponding second magnetic elements MG2 and the third magnetic element MG3, an electromagnetic driving force is generated to drive the second frame 104 to drive the holder 108 to move along the Y-axis or along the X-axis. Therefore, when the optical system 10 is shaken, the holder 108 can be driven by the aforementioned electromagnetic driving force to move on the X-Y plane, so as to achieve the purpose of optical image stabilization.

Figure 7:
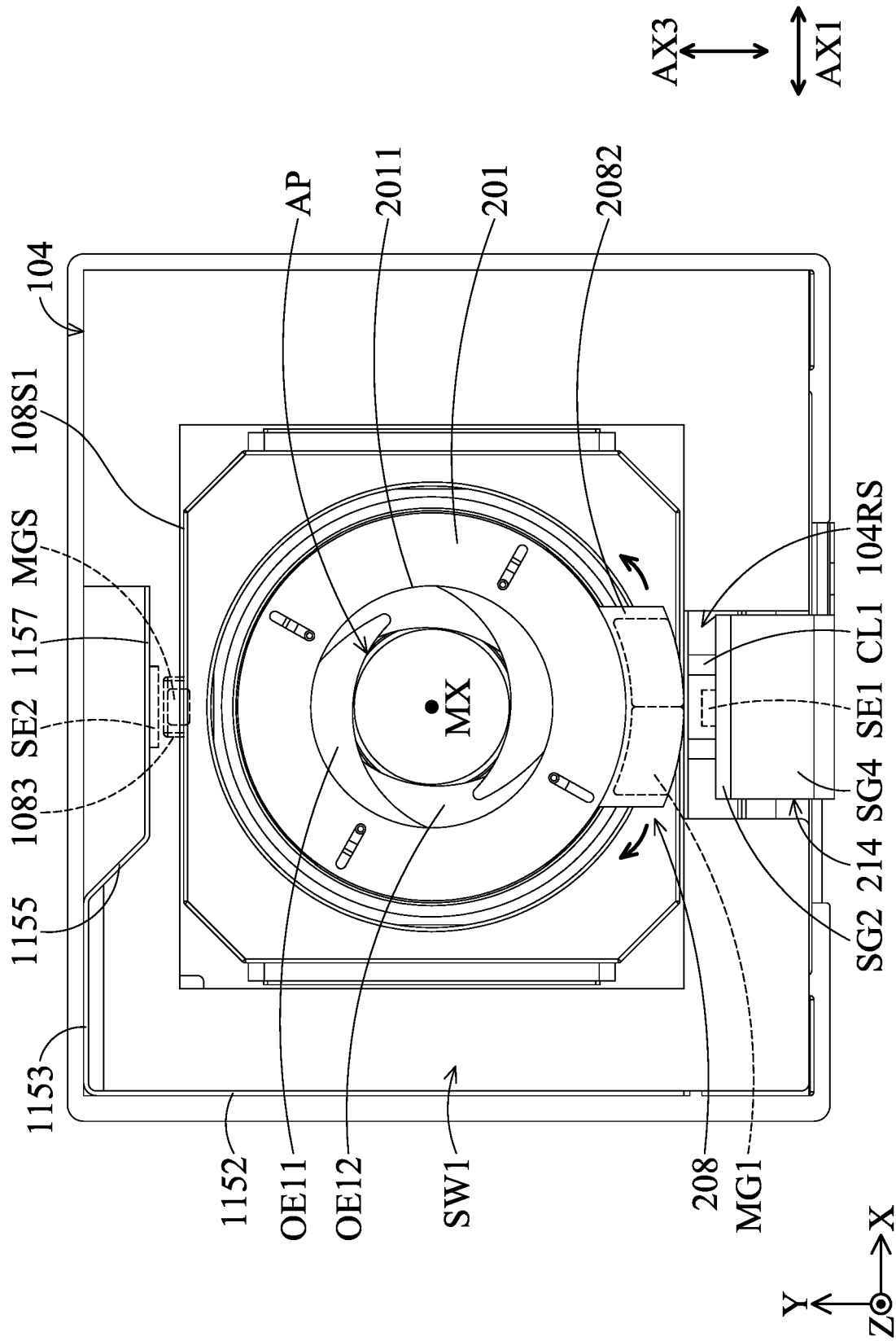
FIG. 7 is a top view of a partial structure of the optical system 10 according to an embodiment of the present disclosure.

Please refer to FIG. 2 and FIG. 7, and FIG. 7 is a top view of a partial structure of the optical system 10 according to an embodiment of the present disclosure. The first coil CL1 is fixedly disposed on the first circuit assembly 214 and electrically connected to the first circuit assembly 214. When the first coil CL1 is energized, the first coil CL1 can act with the first magnetic element MG1 to generate an electromagnetic driving force to drive the first movable element 208 to move around the main axis MX.

Figure 8:
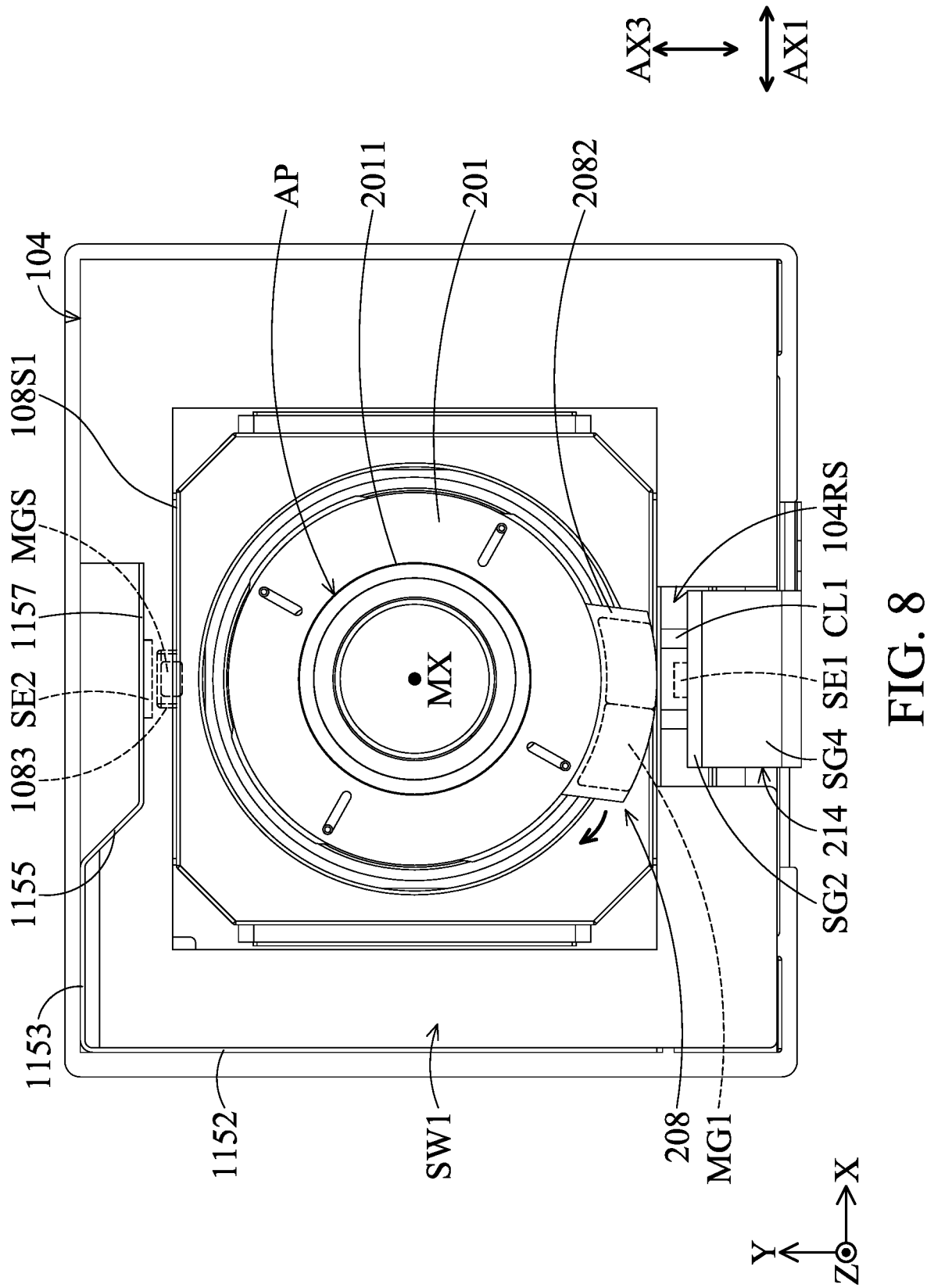
FIG. 8 is a top view of the first movable element 208 in a first extreme position according to an embodiment of the present disclosure.
Figure 9:
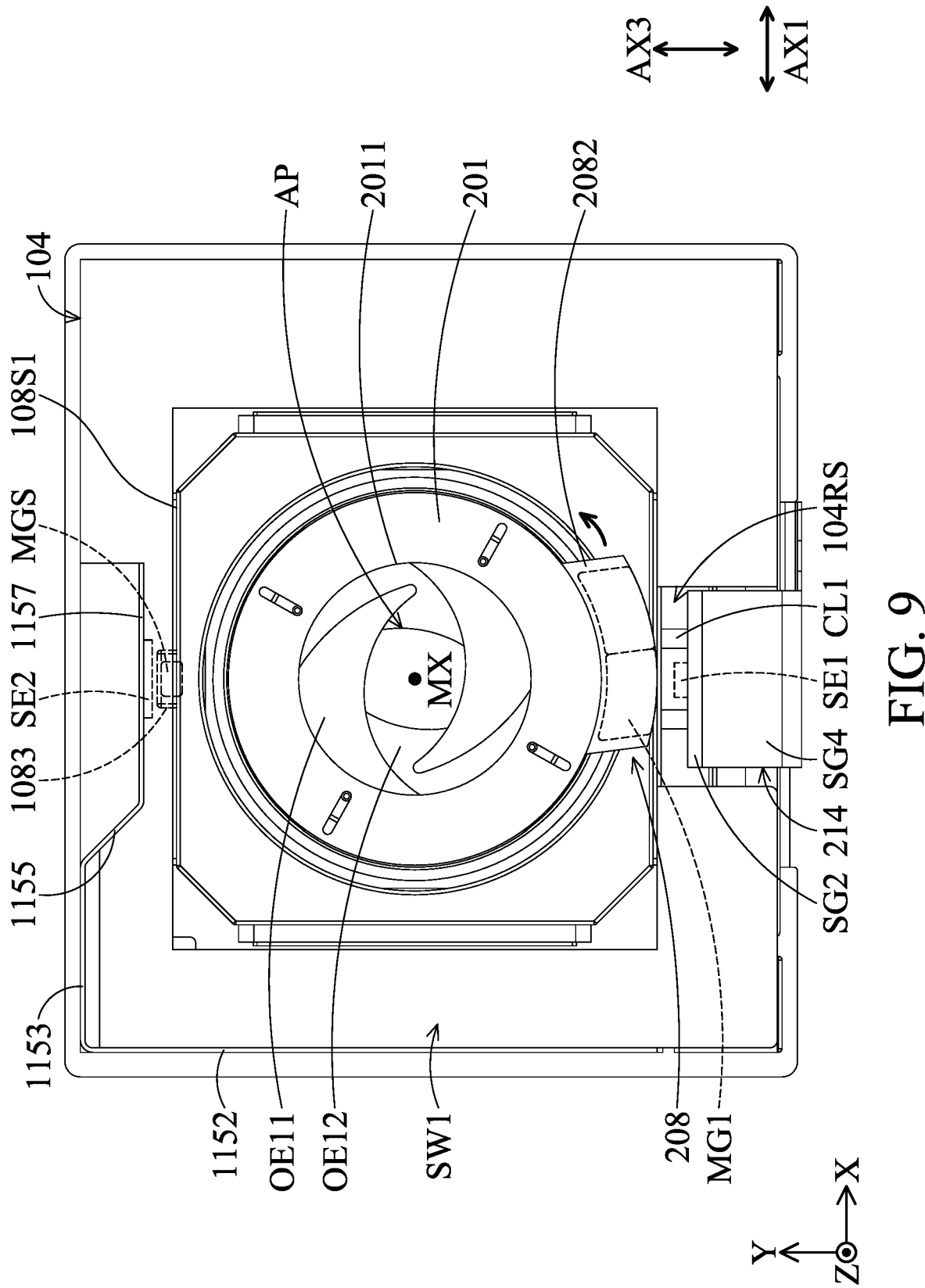
FIG. 9 is a top view of the first movable element 208 in a second extreme position according to an embodiment of the present disclosure.

For example, please refer to FIG. 7 to FIG. 9. FIG. 8 is a top view of the first movable element 208 in a first extreme position according to an embodiment of the present disclosure, and FIG. 9 is a top view of the first movable element 208 in a second extreme position according to an embodiment of the present disclosure. When the first coil CL1 is energized, the first movable element 208 can be driven to move between the first extreme position and the second extreme position, thereby driving the first optical elements (the blades) to move, changing the amount of light that enters the first optical element driving mechanism 200.

For example, as shown in FIG. 8, when the first movable element 208 is in the first extreme position, the first optical elements are accommodated under the outer shielding member 201, so that the aperture AP of the first optical element driving mechanism 200 is the largest size. Then, when it is desired to adjust the size of the aperture AP, the first movable element 208 can be driven to move from the first extreme position in FIG. 8 to the position in FIG. 7, so that the four first optical elements OE11, OE12 begin to shield the first outer opening 2011, and therefore the aperture AP is gradually narrowed.

Furthermore, as shown in FIG. 9, when the first movable element 208 moves from the position in FIG. 7 to the second extreme position in FIG. 9, the four first optical elements OE11, OE12 continue to shield the first outer opening 2011, so that the aperture AP gradually shrinks to its minimum size. Based on the above structural configuration, the size of the aperture AP of the first optical element driving mechanism 200 can be continuously changed, so that the image captured by the optical system 10 can be clearer.

It is worth noting that, as shown in FIG. 7 to FIG. 9, when viewed along the main axis MX, the radial extending portion 2082 has an arc-shaped structure. When viewed along the main axis MX, the first magnetic element MG1 has an arc-shaped structure, and the shape of the arc-shaped structure of the first magnetic element MG1 corresponds to the shape of the arc-shaped structure of the radial extending portion 2082.

Based on such a structural design, it can be ensured that when the first movable element 208 rotates around the main axis MX, the first driving assembly DA1 has sufficient electromagnetic driving force, and the collision of the radial extending portion 2082 with the first coil CL1 can be avoided. In addition, a first position-sensing element SE1 is disposed on the first circuit assembly 214 and is configured to sense the change of the magnetic field of the first magnetic element MG1 to obtain the position of the first movable element 208. It should be noted that the distance between the first position-sensing element SE1 and the first magnetic element MG1 is fixed, so that the sensing accuracy of the first position-sensing element SE can be ensured.

Figure 10:
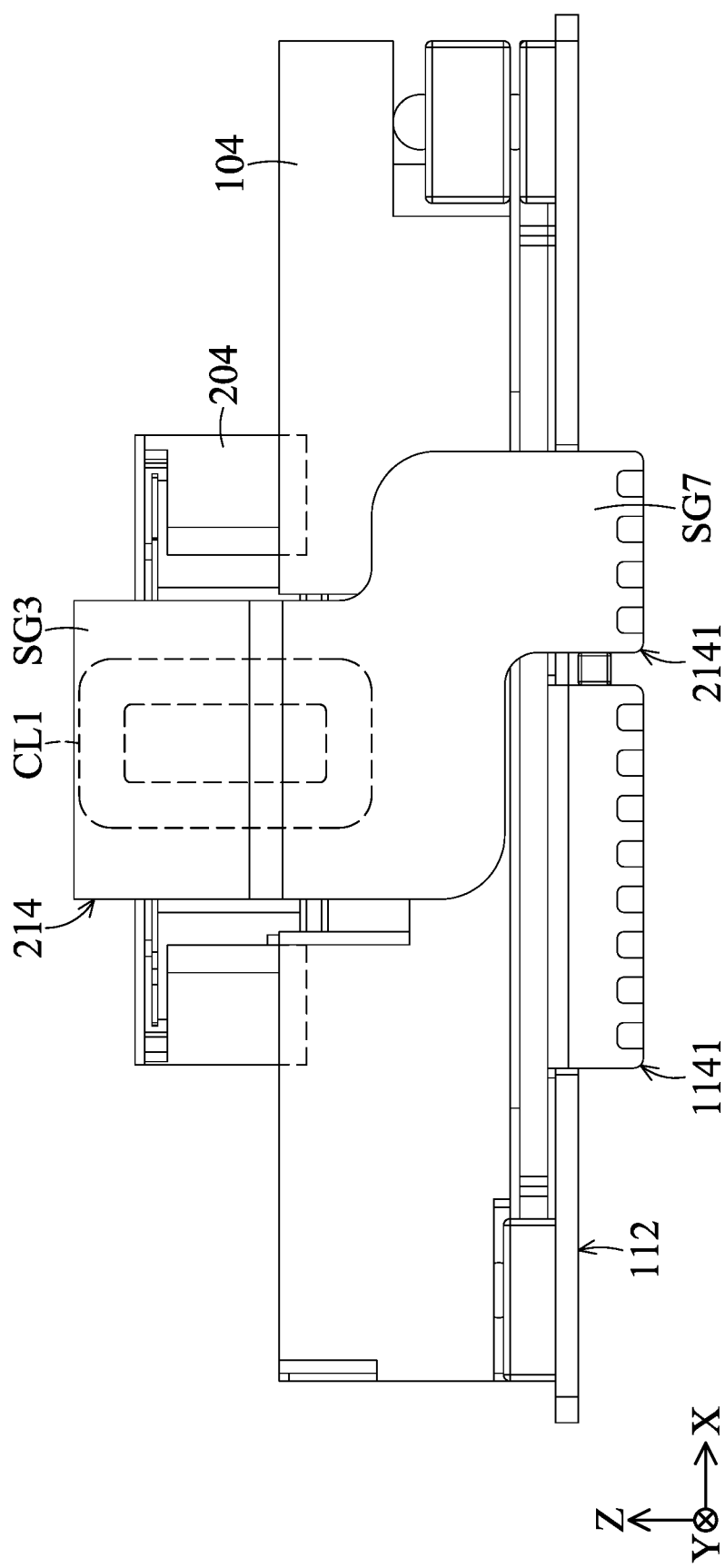
FIG. 10 is a front view of the optical system 10 after removing the casing 102 according to an embodiment of the present disclosure.
Figure 11:
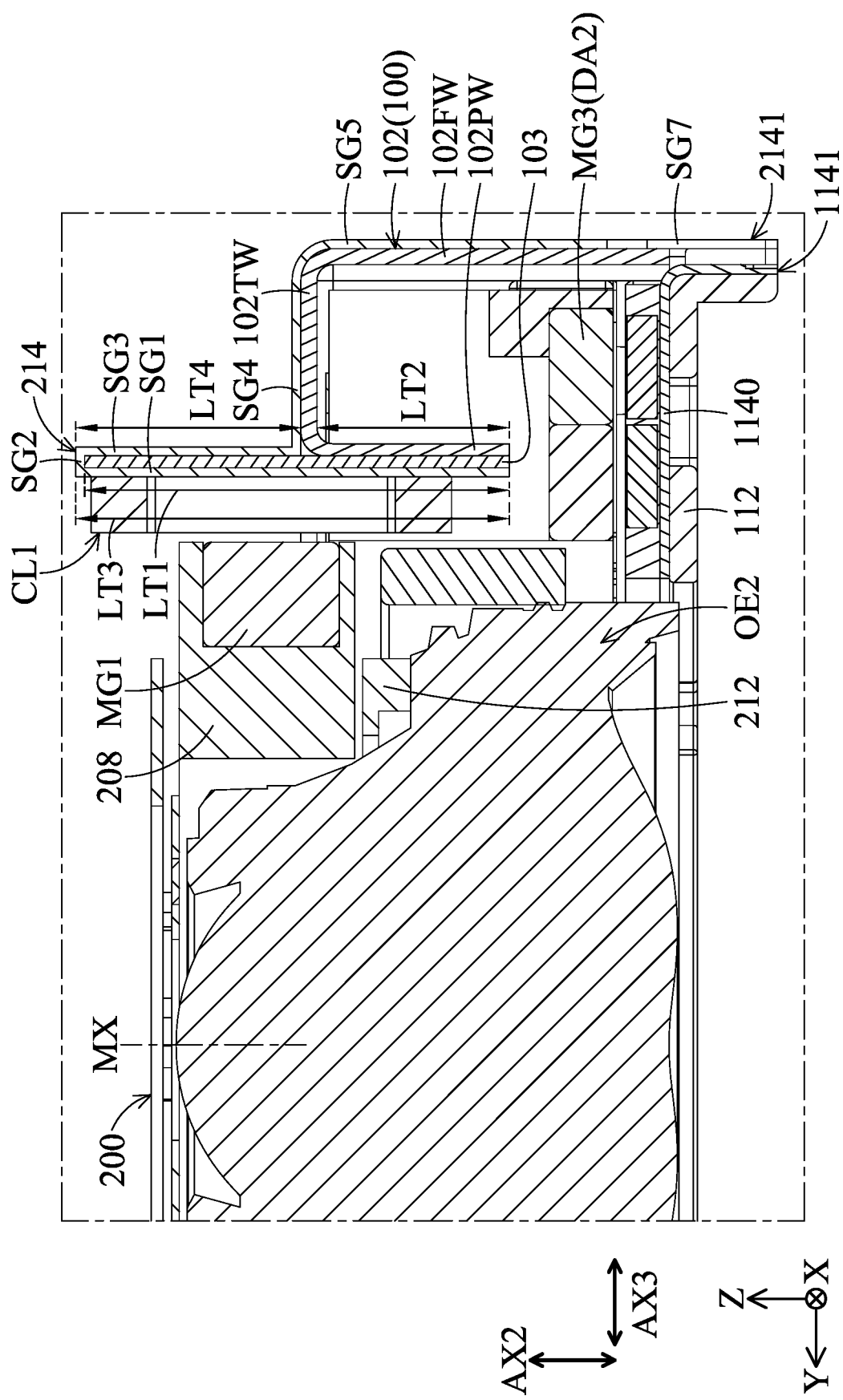
FIG. 11 is a cross-sectional view of the optical system 10 along line A-A in FIG. 1 according to an embodiment of the present disclosure.

Next, please refer to FIG. 10 and FIG. 11. FIG. 10 is a front view of the optical system 10 after removing the casing 102 according to an embodiment of the present disclosure, and FIG. 11 is a cross-sectional view of the optical system 10 along line A-A in FIG. 1 according to an embodiment of the present disclosure. As shown in FIG. 10, the second frame 104 surrounds a portion of the first optical element driving mechanism 200. Furthermore, when viewed in a direction that is perpendicular to the main axis MX, the second frame 104 overlaps at least a portion of the first frame 204.

As shown in FIG. 11, when viewed in a direction that is perpendicular to the main axis MX, a part of the first optical element driving mechanism 200 protrudes from the casing 102, and at least a portion of the first optical element driving mechanism 200 is disposed on the second optical element OE2. For example, the first base 212 is disposed on the second optical element OE2.

Furthermore, as shown in FIG. 11, when viewed along the first axis AX1 (the X-axis), the first magnetic element MG1 is exposed from the casing 102. The first axis AX1 is perpendicular to the main axis MX. When viewed in a direction (such as the Y-axis) perpendicular to the main axis MX, the first magnetic element MG1 overlaps a top wall 102TW of the casing 102.

Moreover, as shown in FIG. 11, the first circuit assembly 214 is fixedly disposed on the casing 102. Specifically, a portion of the first circuit assembly 214 is affixed to the top wall 102TW. When viewed along the first axis AX1, the casing 102 further has a supporting wall 102PW, which extends from the top wall 102TW toward the second base 112 along a second axis AX2. The first axis AX1 is perpendicular to the second axis AX2 and the main axis MX, and the second axis AX2 is parallel to the main axis MX.

When viewed along the third axis AX3, the first circuit assembly 214 overlaps the first movable element 208 and at least two first optical elements of the first movable assembly MA1. When viewed along the second axis AX2, a portion of the first circuit assembly 214 overlaps the third magnetic element MG3 of the second driving assembly DA2.

In this embodiment, as shown in FIG. 2 and FIG. 11, the second fixed assembly FA2 may further include a supporting member 103 affixed to the supporting wall 102PW. The supporting member 103 may have a plate-shaped structure extending along the second axis AX2. When viewed along the first axis AX1, a first length LT1 of the supporting member 103 along the second axis AX2 is different from a second length LT2 of the supporting wall 102PW along the second axis AX2.

Specifically, when viewed along the first axis AX1, the first length LT1 of the supporting member 103 along the second axis AX2 is greater than the second length LT2 of the supporting wall 102PW along the second axis AX2. In this embodiment, the first length LT1 is more than twice the second length LT2, but it is not limited thereto.

In addition, it is worth noting that, in order to avoid affecting the magnetic field and driving capability of the first driving assembly DA1 and the second driving assembly DA2, the casing 102 and the supporting member 103 in this embodiment are made of non-magnetic metal materials. The supporting member 103 can be affixed to the supporting wall 102PW of the casing 102 by glue, but it is not limited thereto. The supporting member 103 can be affixed to the supporting wall 102PW by laser welding, so as to increase the connection strength.

Figure 12:
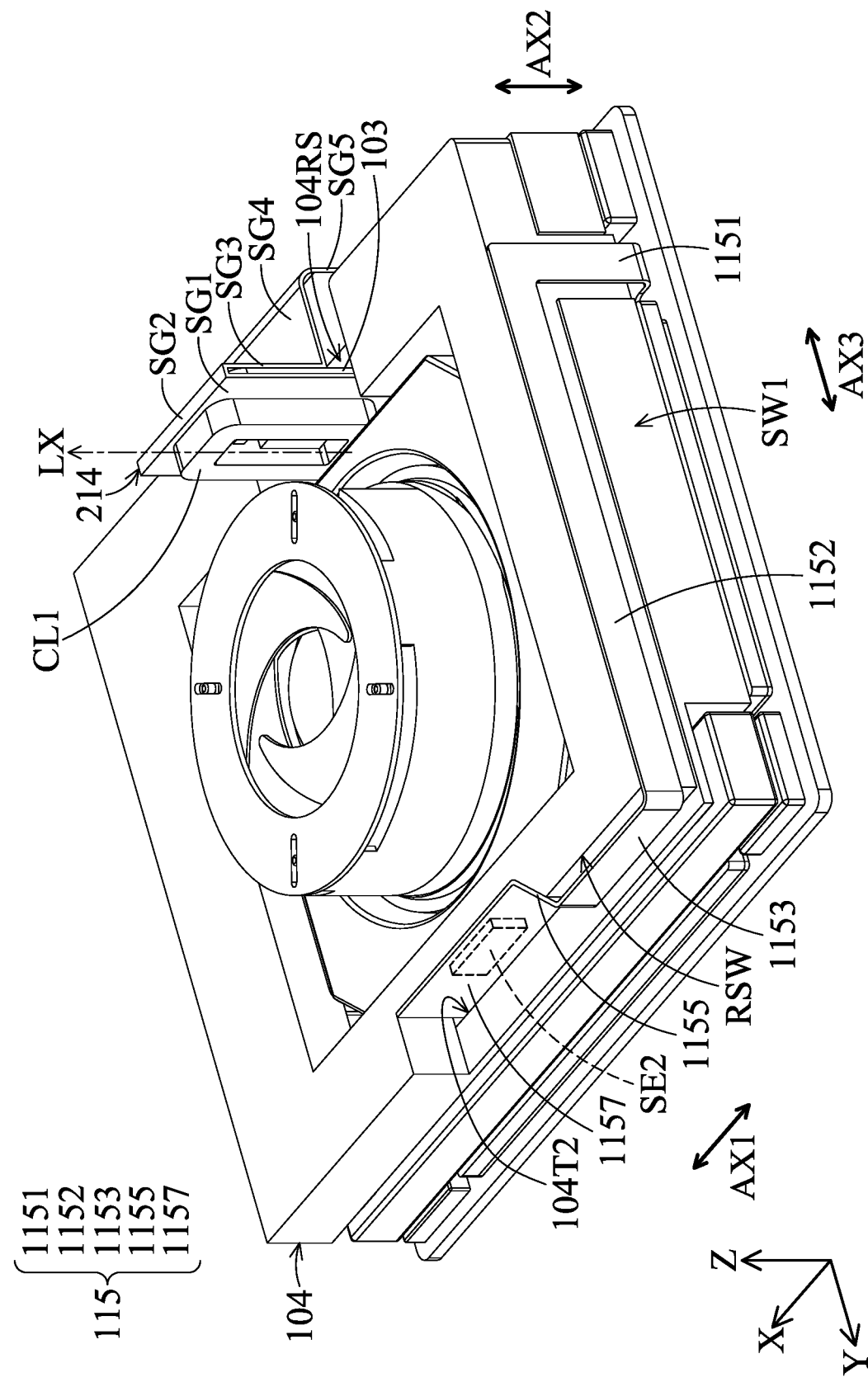
FIG. 12 and FIG. 13 are schematic diagrams of the optical system 10 after removing the casing 102 in different views according to an embodiment of the present disclosure.
Figure 13:
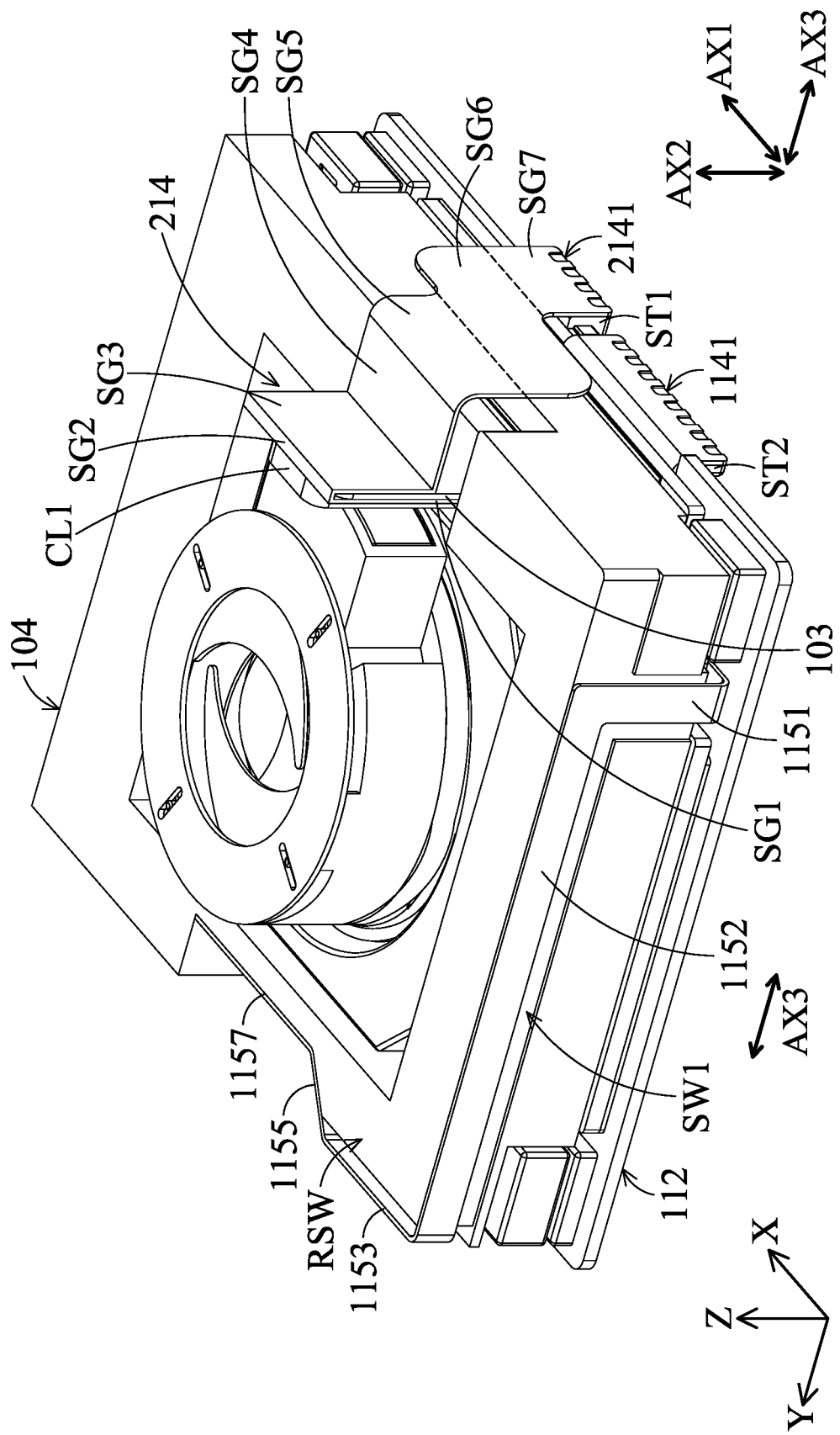

Please refer to FIG. 2, FIG. 7 and FIG. 11 to FIG. 13. FIG. 12 and FIG. 13 are perspective diagram of the optical system 10 after removing the casing 102 in different view according to an embodiment of the present disclosure. In this embodiment, the first circuit assembly 214 may have a first segment SG1, a second segment SG2 and a third segment SG3.

As shown in FIG. 11, the second segment SG2 is connected between the first segment SG1 and the third segment SG3, and the first segment SG1, the second segment SG2 and the third segment SG3 are affixed to the supporting member 103. The first segment SG1 and the third segment SG3 extend along the second axis AX2, and the second segment SG2 extends along the third axis AX3.

As shown in FIG. 11, when viewed along the first axis AX1, the first segment SG1 and the third segment SG3 are fixed on opposite sides of the supporting member 103. When viewed along the first axis AX1, a third length LT3 of the first segment SG1 along the second axis AX2 is different from a fourth length LT4 of the third segment SG3 along the second axis AX2.

Specifically, when viewed along the first axis AX1, the third length LT3 of the first segment SG1 along the second axis AX2 is greater than the fourth length LT4 of the third segment SG3 along the second axis AX2.

As shown in FIG. 2 and FIG. 12, the first coil CL1 is fixedly disposed on the first segment SG1, and the first coil CL1 can define a long axis LX parallel to the second axis AX2.

As shown in FIG. 11, when viewed along the third axis AX3, the first segment SG1 can completely cover the first coil CL1. When viewed along the third axis AX3, the first segment SG1, the supporting member 103 and the first coil CL1 exceed the second optical element driving mechanism 100. Moreover, the first coil CL1 of the first driving assembly DA1 also exceeds the first base 212 and the first movable element 208 of the first fixed assembly FA1.

As shown in FIG. 13, in this embodiment, the first circuit assembly 214 may further have a fourth segment SG4, a fifth segment SG5, a sixth segment SG6 and a seventh segment SG7. The fourth segment SG4 is connected between the third segment SG3 and the fifth segment SG5, the fifth segment SG5 is connected between the fourth segment SG4 and the sixth segment SG6, and the sixth segment SG6 is connected between the fifth segment SG5 and the seventh segment SG7.

The fourth segment SG4 extends along the third axis AX3, and the fourth segment SG4 is affixed to the top wall 102TW. The fifth segment SG5 to the seventh segment SG7 are affixed to a front side wall 102FW of the casing 102.

As shown in FIG. 13, when viewed along the third axis AX3, the fifth segment SG5 and the seventh segment SG7 extend along the second axis AX2, and when viewed along the third axis AX3, the sixth segment SG6 extends along the first axis AX1.

When viewed along the third axis AX3, the width of the fifth segment SG5 along the first axis AX1 is different from the width of the seventh segment SG7 along the first axis AX1. Specifically, when viewed along the third axis AX3, the width of the fifth segment SG5 along the first axis AX1 is greater than the width of the seventh segment SG7 along the first axis AX1.

As shown in FIG. 7 and FIG. 12, the second frame 104 may form an accommodating groove 104RS configured to accommodate the supporting member 103 and a portion of the first circuit assembly 214. When viewed along the second axis AX2, the width of the accommodating groove 104RS is greater than the width of the second segment SG2. Based on this structural design, the movement of the second frame 104 relative to the second base 112 can be ensured, and the purpose of miniaturization can be achieved at the same time.

In this embodiment, the second circuit assembly 114 is a flexible circuit board, which includes a substrate 1140 and a second circuit element 115, and the substrate 1140 and the second circuit element 115 are integrally formed in one piece. In this embodiment, the second circuit element 115 may include a first extending portion 1151, a second extending portion 1152, a third extending portion 1153, a curved portion 1155 and a second contact portion 1157.

The first extending portion 1151 extends from the substrate 1140 along the second axis AX2. The second extending portion 1152 is connected to the first extending portion 1151, the second extending portion 1152 is connected to the third extending portion 1153, and the extending directions of the second extending portion 1152 and the third extending portion 1153 are different. For example, the second extending portion 1152 extends along the third axis AX3, while the third extending portion 1153 extends along the first axis AX1.

The curved portion 1155 is connected between the second contact portion 1157 and the third extending portion 1153. The extending direction of the curved portion 1155 is different from the extending direction of the second contact portion 1157 and the third extending portion 1153. The second extending portion 1152 is in contact with a first sidewall SW1 of the second frame 104, the third extending portion 1153 is not in contact with a rear sidewall RSW of the second frame 104, and a portion of the curved portion 1155 is not in contact with the rear sidewall RSW.

The second contact portion 1157 is in contact with the rear sidewall RSW. Specifically, a second slot 104T2 is formed on the rear sidewall RSW, and a portion of the second contact portion 1157 is inserted into the second slot 104T2. Based on the design of the second slot 104T2, the convenience and assembly accuracy of the second circuit assembly 114 to be installed on the second frame 104 can be increased.

A second position-sensing element SE2 is disposed on the second contact portion 1157, and the second position-sensing element SE2 is electrically connected to the second contact portion 1157 of the second circuit assembly 114. As shown in FIG. 7, when viewed along the main axis MX, the second position-sensing element SE2 overlaps the second frame 104.

A sensing magnet MGS is disposed in a protruding structure 1083 of the holder 108, and the sensing magnet MGS corresponds to the second position-sensing element SE2. When viewed along the main axis MX, the shortest distance between the second position-sensing element SE2 and a side 108S1 of the holder 108 is greater than the shortest distance between the second position-sensing element SE2 and the sensing magnet MGS.

Furthermore, when viewed along the main axis MX, the distance between the sensing magnet MGS and the second contact portion 1157 in the third axis AX3 is less than the distance between the sensing magnet MGS and the third extending portion 1153 in the third axis AX3. Based on the above structural configuration, the sensing accuracy of the second position-sensing element SE2 can be increased.

Moreover, as shown in FIG. 10, FIG. 11 and FIG. 13, the first circuit assembly 214 has a first electrical connection portion 2141, and the second circuit assembly 114 has a second electrical connection portion 1141. The first electrical connection portion 2141 and the second electrical connection portion 1141 are located on the same side of the optical system 10 and are configured to be electrically connected to the aforementioned external control circuit, such as a control chip.

The second base 112 has a first supporting portion ST1 configured to support the first electrical connection portion 2141. The second base 112 further has a second supporting portion ST2 configured to support the second electrical connection portion 1141.

As shown in FIG. 11, when viewed along the first axis AX1, the first electrical connection portion 2141 does not overlap the second electrical connection portion 1141. When viewed along the first axis AX1, the fourth segment SG4 to the seventh segment SG7 do not overlap the casing 102. Based on this design, the positioning accuracy of the optical system 10 during installation can be increased.

In conclusion, the present disclosure provides an optical system 10 including a first optical element driving mechanism 200 and a second optical element driving mechanism 100. The first optical element driving mechanism 200 may serve as an aperture mechanism, configured to adjust the amount of light entering the optical system 10. The second optical element driving mechanism 100 can achieve the functions of auto-focusing (AF) and optical image stabilization (OIS).

In some embodiments, the second fixed assembly FA2 may include the supporting member 103 affixed to the casing 102, and the supporting member 103 extends beyond the casing 102 along the second axis AX2. The first circuit assembly 214 is a flexible circuit board configured to be bent into multiple segments to be fixed on the supporting member 103, and the first coil CL1 is affixed to the first segment SG1. Based on this structural configuration, the convenience for the operator to install the first circuit assembly 214 and the first coil CL1 can be increased, and the movement of the first movable element 208 can be more stable and smooth. Furthermore, based on the configuration of the first coil CL1, the first magnetic element MG1 and the first movable element 208, the aperture size of the first optical element driving mechanism 200 can be continuously changed.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:
1. An optical system, comprising:
a first optical element driving mechanism, comprising:
a first fixed assembly;
a first movable assembly, configured to be connected to at least two first optical elements, wherein the first movable assembly is movable relative to the first fixed assembly, and the first movable assembly comprises a first movable element; and
a first driving assembly, configured to drive the first movable assembly to move relative to the first fixed assembly;
wherein the first fixed assembly and the first movable assembly are arranged along a main axis, and the first driving assembly is configured to drive the first movable element to move around the main axis, and a portion of the first driving assembly is disposed on the first movable element;
when viewed in a direction perpendicular to the main axis, the first driving assembly exceeds the first fixed assembly and the first movable assembly;
the optical system further comprises a second optical element driving mechanism;
the first optical element driving mechanism is disposed on the second optical element driving mechanism;
the second optical element driving mechanism comprises a second fixed assembly, and the second fixed assembly includes a casing;
the casing surrounds a portion of the first optical element driving mechanism;
the first optical element driving mechanism further comprises a first circuit assembly fixedly disposed on the casing; and
the first circuit assembly is located outside the casing.
2. The optical system as claimed in claim 1, wherein the second optical element driving mechanism further comprises:
a second movable assembly, configured to be connected to a second optical element; and
a second driving assembly, configured to drive the second movable assembly and the second optical element to move relative to the second fixed assembly;
the second fixed assembly: further comprises a second base;
the casing is affixed to the second base to form an accommodation space; and
the accommodation space is configured to accommodate the second movable assembly and the second driving assembly.
3. The optical system as claimed in claim 2, wherein
when viewed in a direction perpendicular to the main axis, a portion of the first optical element driving mechanism protrudes from the casing;
the first driving assembly comprises a first coil and a first magnetic element, and the first coil corresponds to the first magnetic element; and
the first coil is fixedly disposed on the first circuit assembly.
4. The optical system as claimed in claim 3, wherein
the casing has a top wall, and a portion of the first circuit assembly is affixed to the top wall;
when viewed along a first axis, the casing further has a supporting wall, which extends from the top wall toward the second base along a second axis;

the first axis is perpendicular to the second axis and the main axis;
the second axis is parallel to the main axis;
when viewed along a third axis, the first circuit assembly overlaps the first movable assembly and the at least two first optical elements;
the third axis is perpendicular to the first axis and the second axis; and
when viewed along the second axis, a portion of the first circuit assembly overlaps the second driving assembly.

5. The optical system as claimed in claim 4, wherein
the second fixed assembly further comprises a supporting member which is affixed to the supporting wall;
the supporting member has a plate-shaped structure extending along the second axis; and
when viewed along the first axis, a first length of the supporting member along the second axis is different from a second length of the supporting wall along the second axis.

6. The optical system as claimed in claim 5, wherein
when viewed along the first axis, the first length of the supporting member along the second axis is greater than the second length of the supporting wall along the second axis;
the first length is more than twice the second length; and
the casing and the supporting member are made of non-magnetic metal materials.

7. The optical system as claimed in claim 6, wherein
the first circuit assembly has a first segment, a second segment and a third segment;
when viewed along the first axis, the second segment is connected between the first segment and the third segment;
the first segment, the second segment and the third segment are affixed to the supporting member;
the first segment and the third segment extend along the second axis;
the second segment extends along the third axis; and
when viewed along the first axis, the first segment and the third segment are fixed on opposite sides of the supporting member.

8. The optical system as claimed in claim 7, wherein
when viewed along the first axis, a third length of the first segment along the second axis is different from a fourth length of the third segment along the second axis; and
when viewed along the first axis, the third length of the first segment along the second axis is greater than the fourth length of the third segment along the second axis.

9. The optical system as claimed in claim 8, wherein
the first coil is fixedly disposed on the first segment;
the first coil defines a long axis parallel to the second axis;
when viewed along the third axis, the first segment completely covers the first coil; and
when viewed along the third axis, the first segment, the supporting member and the first coil exceed the second optical element driving mechanism.

10. The optical system as claimed in claim 9, wherein
the first circuit assembly further has a fourth segment, a fifth segment, a sixth segment and a seventh segment;
the fourth segment is connected between the third segment and the fifth segment;
the fifth segment is connected between the fourth segment and the sixth segment;
the sixth segment is connected between the fifth segment and the seventh segment; and
the fourth segment extends along the third axis.

11. The optical system as claimed in claim 10, wherein
the fourth segment is affixed to the top wall;
the fifth segment to the seventh segment are affixed to a front side wall of the casing;
when viewed along the third axis, the fifth segment and the seventh segment extend along the second axis; and
when viewed along the third axis, the sixth segment extends along the first axis.

12. The optical system as claimed in claim 10, wherein
when viewed along the third axis, a width of the fifth segment along the first axis is different from a width of the seventh segment along the first axis; and
when viewed along the third axis, the width of the fifth segment along the first axis is greater than the width of the seventh segment along the first axis.

13. The optical system as claimed in claim 12, wherein
the second movable assembly includes a holder and a second frame;
the second frame surrounds a portion of the first optical element driving mechanism;
when viewed in a direction perpendicular to the main axis, the second frame overlaps at least a portion of a first frame of the first fixed assembly;
the second frame forms an accommodating groove configured to accommodate the supporting member and a portion of the first circuit assembly; and
when viewed along the second axis, a width of the accommodating groove is greater than a width of the second segment.

14. The optical system as claimed in claim 13, wherein
the first movable element includes a first body and a radial extending portion;
the first body has a ring structure;
the radial extending portion radially extends from the first body;
the radial extending portion has a receiving groove; and
the first magnetic element is disposed in the receiving groove.

15. The optical system as claimed in claim 14, wherein
when viewed along the main axis, the radial extending portion has an arc-shaped structure;
when viewed along the main axis, the first magnetic element has an arc-shaped structure;
a shape of the arc-shaped structure of the first magnetic element corresponds to a shape of the arc-shaped structure of the radial extending portion;
when viewed along a first axis, the first magnetic element is exposed from the casing; and
when viewed in a direction perpendicular to the main axis, the first magnetic element overlaps the top wall.

16. The optical system as claimed in claim 15, wherein
the second optical driving mechanism further comprises a second circuit assembly electrically connected to the second driving assembly;
the second circuit assembly comprises a substrate and a second circuit element;
the second circuit element comprises a first extending portion, a second extending portion, a third extending portion, a curved portion and a second contact portion;
the first extending portion extends from the substrate along the second axis;
the second extending portion is connected to the first extending portion;
the second extending portion is connected to the third extending portion;
extending directions of the second extending portion and the third extending portion are different;

the curved portion is connected between the second contact portion and the third extending portion; and an extending direction of the curved portion is different from an extending direction of the second contact portion and the third extending portion.

17. The optical system as claimed in claim 16, wherein
the second extending portion is in contact with a first sidewall of the second frame;
the third extending portion is not in contact with a rear sidewall of the second frame;
a portion of the curved portion is not in contact with the rear sidewall;
the second contact portion is in contact with the rear sidewall; and
a second slot is formed on the rear sidewall, and a portion of the second contact portion is inserted into the second slot.

18. The optical system as claimed in claim 17, wherein
a second position-sensing element is disposed on the second contact portion;
the second position-sensing element is electrically connected to the second contact portion; and
when viewed along the main axis, the second position-sensing element overlaps the second frame.

19. The optical system as claimed in claim 18, wherein
a sensing magnet is disposed in a protruding structure of the holder, and the sensing magnet corresponds to the second position-sensing element;
when viewed along the main axis, a shortest distance between the second position-sensing element and a side of the holder is greater than a shortest distance between the second position-sensing element and the sensing magnet; and
when viewed along the main axis, a distance between the sensing magnet and the second contact portion in the third axis is less than a distance between the sensing magnet and the third extending portion in the third axis.

20. The optical system as claimed in claim 19, wherein
the first circuit assembly has a first electrical connection portion;
the second circuit assembly has a second electrical connection portion;
the first electrical connection portion and the second electrical connection portion are located on a same side of the optical system;
the second base has a first supporting portion configured to support the first electrical connection portion;
the second base further has a second supporting portion configured to support the second electrical connection portion;
when viewed along the first axis, the first electrical connection portion does not overlap the second electrical connection portion; and
when viewed along the first axis, the fourth segment to the seventh segment do not overlap the casing.

* * * * *